United States Patent [19]

Harara et al.

[11] Patent Number: 4,887,840
[45] Date of Patent: Dec. 19, 1989

[54] SUSPENSION CONTROL APPARATUS FOR A VEHICLE

[75] Inventors: Mitsuhiko Harara; Shozo Takizawa; Tadao Tanaka, all of Okazaki; Shunichi Wada; Shigeki Ohtagaki, both of Himeji, all of Japan

[73] Assignee: Mitsubishi Kenki Kabushiki Kaisha, Tokyo, Japan

[21] Appl. No.: 267,951

[22] Filed: Nov. 7, 1988

[30] Foreign Application Priority Data

Nov. 5, 1987 [JP] Japan .................. 62-169215[U]

[51] Int. Cl.$^4$ ............................................ B10H 17/06
[52] U.S. Cl. .................... 280/707; 180/41; 280/6.1; 280/703; 280/709
[58] Field of Search .............. 180/41; 280/707, 640, 280/6.1, 6.11, 703, 709, DIG. 1

[56] References Cited

U.S. PATENT DOCUMENTS

| | | | |
|---|---|---|---|
| 3,035,853 | 5/1962 | Klein | 280/709 |
| 3,502,347 | 3/1970 | Busignies | 280/707 |
| 3,603,612 | 9/1971 | Hill et al. | 280/707 |
| 3,632,131 | 1/1972 | Engfer | 280/707 |
| 3,892,424 | 7/1975 | Takahashi et al. | 280/709 |
| 3,917,295 | 11/1975 | Hiruma | 280/709 |
| 4,728,120 | 3/1988 | Buma et al. | 280/707 |
| 4,741,554 | 5/1988 | Okamoto | 280/707 |
| 4,765,649 | 8/1988 | Ikemoto et al. | 280/703 |

FOREIGN PATENT DOCUMENTS 0142947 4/1985 European Pat. Off.

OTHER PUBLICATIONS

The Application of Active Suspension to High Performance Road Vehicles, by P. G. Wright, et al., pp. 333-337.

Primary Examiner—Richard A. Bertsch
Attorney, Agent, or Firm—Sughrue, Mion, Zinn, Macpeak and Seas

[57] ABSTRACT

Disclosed is a suspension control apparatus for a vehicle having a plurality of suspension units each disposed between a road wheel and the body of a vehicle for effectively and quickly correcting any deviation of the vehicle height from a normal height level immediately upon finishing of active suspension control operations. Priority is determined for vehicle-height control and various active suspension control operations such as roll control, nose-dive and squat control, and pitching and bouncing control so that normal vehicle-height control is stopped or inhibited during active suspension control operations are being carried out, thereby preventing the traveling attitude of the vehicle from being made unstable. Also, a vehicle-height control determining time interval from the instant when active suspension control operations has been finished until the time when vehicle-height control is restarted is substantially reduced as compared with that required in the case when the vehicle is traveling in a normal attitude without any active suspension control operation, whereby any deviation of the vehicle height from a target height level can be quickly removed to make the actual vehicle height match with a target height level in a very short time immediately after the finishing of the active suspension control operations.

4 Claims, 7 Drawing Sheets

LEFT TURN    NEUTRAL    RIGHT TURN

SUSPENSION CONTROL APPARATUS FOR A VEHICLE

BACKGROUND OF THE INVENTION

1. Field of the Invention

The present invention relates generally to a suspension control apparatus for a vehicle which can suppress rolling, nose diving, squatting and vertical motions such as pitching and bouncing of a vehicle so as to provide a more comfortable ride. More particularly, it relates to a suspension control apparatus which serves to inhibit normal vehicle-height control during active suspension control operations but start such height control immediately after the active suspension control operations have been finished. 2. Description of the Related Art In the past, many suspension control apparatus of this type have been known, one example of which is disclosed in Japanese Utility Model Laid-Open No. 61-163710. In this conventional suspension control apparatus, a fluid spring chamber such as a pneumatic spring chamber is interposed between each road wheel and the body of a vehicle so that supply to and discharge from the fluid spring chamber of compressed air is controlled in an appropriate manner to suppress rolling or nose diving of the vehicle body. Specifically, there is a tendency that when a vehicle is steered to turn, the suspension units disposed on the turning side of the vehicle are forced to contract under the action of centrifugal force whereas those on the opposite side thereof expand. In order to suppress this tendency, a predetermined amount of compressed air is supplied to the fluid spring chamber of each of the suspension units on the contracted side, and at the same time a predetermined amount of pressure air is discharged from the fluid spring chamber of each of the suspension units on the expanded side so as to incline the vehicle body in the opposite direction, thereby maintaining the attitude of the vehicle body in a horizontal manner.

With the conventional suspension control apparatus as constructed above, however, for the purpose of effectively performing control of the vehicle attitude such as roll control, nose dive control, squat control and the like, it was first proposed that a change in the height of a vehicle is detected by a vehicle-height sensor so that the vehicle height is adjusted based on the results thus obtained. But such a vehicle-height adjusting technique was subject to time lags in operation and can not attain high control performance.

To improve this, the vehicle-attitude control such as roll control and the like is carried out using quantities for attitude control which are determined in an open loop manner. In this case, however, because of the open loop control, there is the possibility that the average vehicle height during roll control does not match a target vehicle height in the case of an extreme rolling condition such as great rolling.

To correct or accommodate such a deviation or difference between the average and the target vehicle height by employing normal vehicle-height control can not meet the rolling condition of the vehicle or can not effectively suppress rolling of the vehicle due to too large time lag n control operation.

Further, when roll control is finished and the vehicle is restored to normal running attitude, the height of the vehicle does not often return to the average height which it took before commencement of the roll control. In the case of returning the vehicle height to the average level by means of normal height control, it is usual practice not to make vehicle-height control follow a rapid change in the vehicle height in a short time which requires control of the vehicle attitude. As a result, there is the drawback that it takes a relatively long time, e.g. 30 seconds, to correct or remedy the deviation of the vehicle height from the normal height level after finishing of the roll control.

Moreover, the above-described conventional suspension control apparatus, which performs active suspension control operations each in a open loop mode, also has another drawback in that a plurality of suspension control operations can not be conducted simultaneously with each other.

SUMMARY OF THE INVENTION

Accordingly, the present invention is intended to overcome the above described drawbacks encountered in the conventional suspension control apparatus.

It is an object of the present invention to provide a suspension control apparatus for a vehicle which is capable of not only avoiding the above-mentioned inconveniences during active suspension control operations but also effectively and quickly correcting any deviation of the vehicle height from a normal height level immediately upon finishing of the active suspension control operations.

In order to achieve the above object, the present invention provides a suspension control apparatus for a vehicle which comprises:

a plurality of suspension units each disposed between a road wheel and the body of a vehicle for suspending the corresponding road wheel from the vehicle body;

vehicle-height sensing means sensing a vertical distance between an axle of each of said road wheels and a specific portion of the vehicle body;

roll sensing means sensing a rolling state of the vehicle body;

nose-dive and squat sensing means sensing a nose-dive state and a squat state of the vehicle;

pitching and bouncing sensing means sensing vertical movements of the vehicle body including pitching and bouncing thereof; and a control unit electrically connected to receive outputs of said vehicle-height sensing means, said roll sensing means, said nose-dive and squat sensing means, and said pitching and bouncing sensing means for controlling said suspension units in such a manner that if there is a difference between the vertical distance sensed by said vehicle-height sensing means and the target vehicle height, the difference is reduced to zero, and that forces acting between the road wheels and the vehicle body are adjusted to suppress the nose diving, squatting, pitching and bouncing of the vehicle body, said control unit being further operable to determine the order of priority for the vehicle-height and roll control, the nose-dive and squat control, and the pitching and bouncing control so that the vehicle-height control is stopped during the time when a control having higher priority than the vehicle-height control is being carried out.

Preferably, the control unit is further operable to reduce a height-control determining time interval between the finishing of the height-control stopping operation and the starting of the vehicle-height controlling operation in comparison with that required during a normal operating state of the vehicle in which no active suspension control is performed.

In one embodiment, the control unit comprises:

vehicle-height controlling means for comparing the vertical distance sensed by said vehicle-height sensing means with a target vehicle height and for controlling the operations of said suspension units in such a manner that if there is a difference between the vertical distance sensed by said vehicle-height sensing means and the target vehicle height, said suspension units are operated to reduce the difference to zero;

first memory means for storing a roll controlling quantity corresponding to the rolling state of the vehicle body sensed by said roll sensing means;

roll controlling means for controlling the operations of said suspension units in accordance with the roll controlling quantity stored in said first memory means so as to suppress the rolling of the vehicle body;

second memory means storing a nose-dive controlling quantity and a squat controlling quantity corresponding to the nose-dive state and the squat state, respectively, of the vehicle body sensed by said nose-dive and squat sensing means;

nose-dive and squat controlling means for controlling the operations of said suspension units in accordance with the nose-dive and squat controlling quantities stored in said second memory means so as to suppress the nose diving and squatting of the vehicle body;

third memory means storing a pitching controlling quantity and a bouncing controlling quantity corresponding to the pitching and the bouncing of the vehicle body sensed by said pitching and bouncing sensing means;

pitching and bouncing controlling means for controlling the operations of said suspension units in accordance with the pitching and bouncing controlling quantities stored in said third memory means so as to suppress the pitching and bouncing of the vehicle body;

priority determining means for determining the order of priority for the vehicle-height and roll control, the nose-dive and squat control, and the pitching and bouncing control; and height-control stopping means for stopping vehicle-height control during the time when a control having higher priority than the vehicle-height control as determined by said priority determining means is being carried out.

Preferably, the control unit further comprises time-saving means for reducing a height-control determining time interval between the finishing of the height-control stopping operation of said height-control stopping means and the starting of the vehicle-height controlling operation in comparison with that required during a normal operating state of the vehicle in which no active suspension control is performed.

According to the present invention, priority is determined for vehicle-height control and various active suspension control operations such as roll control, nose-diving and squat control, and pitching and bouncing control so that normal vehicle-height control is stopped or inhibited during active suspension control operations are being carried out, thereby preventing the traveling attitude of the vehicle from being made unstable. Also, the vehicle-height control determining time interval from the instant when the active suspension control has been finished until the time when vehicle-height control is restarted is substantially reduced as compared with that required in the case when the vehicle is traveling in a normal attitude without any active suspension control operation, whereby any deviation of the vehicle height from a target height level can be quickly removed to make the actual vehicle height match with the target height level in a very short time immediately after the finishing of the active suspension control operations.

The above and other objects, features and advantages of the present invention will become more apparent from the following detailed description of a preferred embodiment of the invention when taken in conjunction with the accompanying drawings.

DESCRIPTION OF THE PREFERRED EMBODIMENT

The present invention will now be described in detail, by way of example, with reference to the accompanying drawings.

Figure 1:
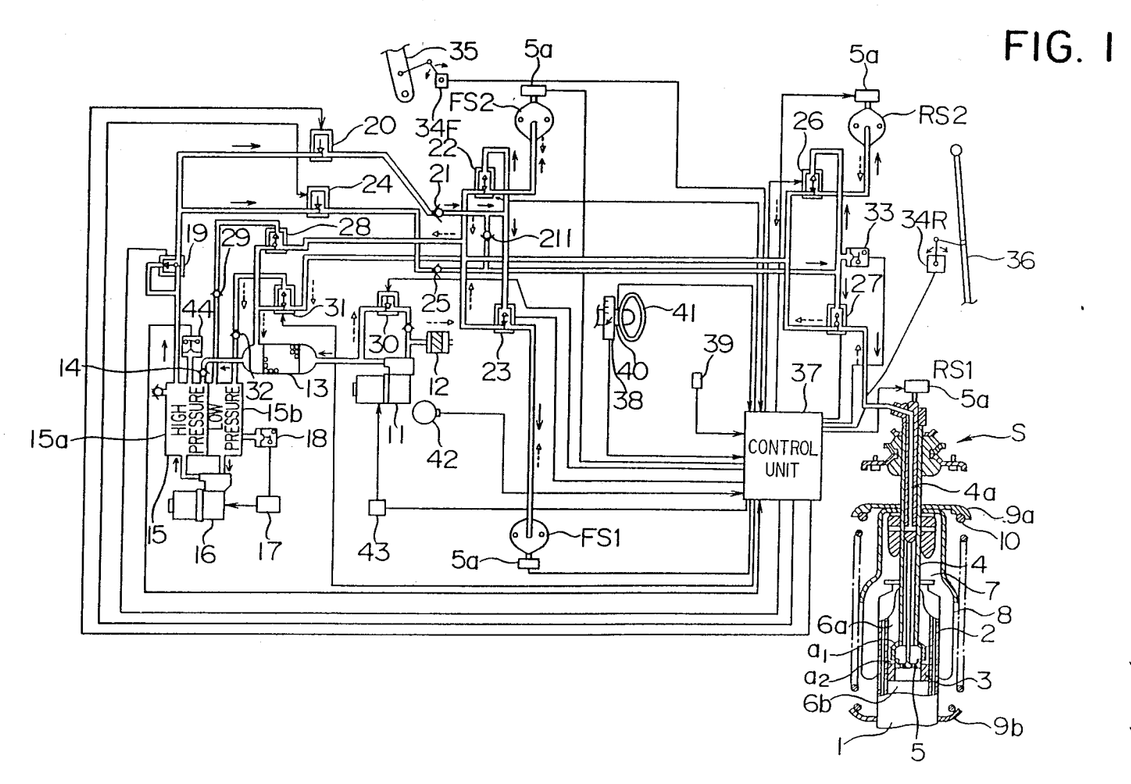
FIG. 1 is a circuit diagram showing the construction of a suspension control apparatus for a vehicle in accordance with the present invention.

Referring first to FIG. 1, there is illustrated the general arrangement of a suspension control apparatus in accordance with the invention which includes two front fluid suspension units FS1, FS2 for the unillustrated right and left front wheels of a vehicle and two rear fluid suspension units RS1, RS2 for the unillustrated right and left rear wheels. All suspension units have substantially the same construction, so except when the front and rear suspension units are specifically distinguished, hereinbelow the suspension units will be referred to simply by the letter S. In the illustrated example, each of the fluid suspension units FS1, FS2, RS1 and RS2 comprises an air suspension unit.

Each of the air suspension units S has a strut-type shock absorber 1 incorporated therein which comprises a cylinder 2 mounted on a front (or rear) wheel of a vehicle and a piston 3 which is slidably inserted in the cylinder 2 to define therein a first chamber 6a and a second chamber 6b on the opposite sides thereof. The piston 3 is fixedly connected with a piston rod 4 at its one end so that as the road wheels of the vehicle are caused to move up and down following road surface irregularities, the cylinder 2 is forced to vertically move with respect to the piston rod 3 so as to effectively absorb or alleviate shocks which are to be transmitted from a road surface to the body of the vehicle which is traveling thereon.

A change-over valve 5 is provided on the piston 3 for changing the damping force of each shock absorber 1. The change-over valve 5 is operatively connected with an actuator 5a so that it is selectively rotated by the actuator 5a to a first position in which the first and second chambers 6a and 6b defined in the cylinder 1 on the opposite sides of the piston 3 are placed in fluid communication with each other through first orifices a1 alone to make the shock absorber 1 in a hard-cushioning mode or to a second position in which the first and second chambers 6a and 6b are placed in fluid communication with each other through first and second orifices a1 and a2 to provide a soft-cushioning mode. The operation of the actuator 5a is controlled by a control unit 37 which will be described later.

Disposed on the upper portion of the shock absorber 1 in a coaxial relation with the piston rod 4 is a primary pneumatic spring chamber 7 which acts as a vehicle-height adjusting means. The primary pneumatic spring chamber 7, a portion of which is constituted by a bellows 8, is in fluid communication with an axial passage 4a which is formed in the piston rod 4 so that air can be supplied to or discharged from the primary pneumatic spring chamber 7 through the axial passage 4a, thereby permitting the vertical movement of the piston rod 4 relative to the cylinder 1.

A first downwardly directed spring retainer 9a is mounted on the top of the primary pneumatic spring chamber 7 and a second upwardly directed spring retainer 9b is provided on the outer peripheral surface of the shock absorber 1 with a coiled spring 10 being disposed under compression between these first and second spring retainers 9a and 9b for biasing the cylinder 2 of the shock absorber 1 downwardly in a direction away from the primary pneumatic spring chamber 7.

A compressor 11 is provided for compressing atmospheric air fed therein through an air cleaner 12 and for supplying the thus compressed air to a dryer 13 wherein the air from the compressor 11 is dried by drying means or agent such as silica gel and fed via a check valve 14 to a high pressure tank 15a of a reservoir 15 and stored therein. The reservoir 15 also has a low pressure tank 15b. These reservoir tanks 15a and 15b are connected with each other through a compressor 16 which is adapted to be driven to operate through a compressor relay 17. A pressure switch 18 is provided which is turned on to drive the compressor relay 17 when the pressure in the low pressure tank 15b increase above the atmospheric pressure, so that the compressor 16 is driven to suck air from the tank 15b and supply compressed air to tank 15a, thereby always maintaining the tank 15b at a subatmospheric pressure.

The compressed air in the high pressure tank 15a is supplied to the respective suspension units FS1, FS2, RS1 and RS2 through distribution piping, as shown in FIG. 1 by arrows in solid lines. For example, compressed air is supplied from the high pressure tank 15a to the front suspension units FS1 and FS2 through a flow control valve 19 in the form of a three-way valve, a front air-supply solenoid valve 20 in the form of an on/off valve, a check valve 21, and a front right-side solenoid valve 22 or a front left-side solenoid valve 23. Similarly, compressed air is supplied from the high pressure tank 15a to the rear suspension units RS1 and RS2 through the flow control valve 19, a rear air-supply solenoid valve 24, a check valve 25, and a rear right-side solenoid valve 26 or a rear left-side solenoid valve 27. The portion of the distribution piping downstream of the check valve 21 is connected with the piping portion downstream of the check valve 25 through a conduit having a check valve 211 therein. On the other hand, air is discharged from the respective suspension units FS1, FS2, RS1 and RS2 to the outside atmosphere through the discharge paths as shown in FIG. 1 by arrows in broken lines. That is, air is first led from the front suspension units FS1 and FS2 to the low pressure tank 15b through the solenoid valves 22 and 23, a front discharge valve 28, and a pressure reserving valve 29, and then discharged from the low pressure tank 15b to the outside atmosphere through the solenoid valves 22 and 23, a front discharge valve 28, the dryer 13, a discharge solenoid valve 30, and the air cleaner 12. Likewise, air in the rear suspension units RS1 and RS2 is first led to the low pressure tank 15b through the rear solenoid valves 26 and 27, a rear discharge valve 31, and a rear pressure reserving valve 32, and then discharged from the low pressure tank 15b to the outside atmosphere through the rear solenoid valves 26 and 27, a rear discharge valve 31, the dryer 13, the discharge solenoid valve 30, and the air cleaner 12.

In this connection, it is to be noted that if the pressure in the low pressure tank 15b of the reservoir 15 is lower than the pressure in the primary pneumatic spring chambers 7, the pressure reserving valves 29 and 32 are opened, whereas if the pressure in the low pressure tank 15b is equal to or higher than the pressure in the primary pneumatic spring chambers 7, the pressure reserving valves 29 and 32 are closed. The first and second rear pneumatic spring chambers 7 are in fluid communication with each other through a communication passage having a pressure switch 33 which sends an output signal to the control unit 37.

A vehicle-height sensing means 34 is provided for sensing the height of the vehicle, i.e., for sensing a vertical distance between an axle of each of the road wheels and a specific portion of the vehicle body, and it comprises a front vehicle-height sensor 34F mounted on a lower arm 35 of the front second (or right-side) suspension unit FS2 for sensing the height of the front portion of the vehicle, and a rear vehicle-height sensor 34R mounted on a lateral rod 36 of the rear first (left-side) suspension unit RS1 for sensing the height of the rear portion of the vehicle. These sensors 34F and 34R have substantially the same construction and are each designed to sense the distance between the present vehicle and a preset normal height level, and the distance between the present vehicle height and a preset low or high height level, and sends out two output signals representative of the distance as sensed in the above manner to the control unit 37. In this connection, it is to be noted that a difference in the vehicle height between the front right-side portion and the rear left-side portion which lie on a diagonal line represents, after adjustment of the vehicle height in the longitudinal direction has been made, an inclination in the transverse direction of the vehicle body. Thus, by means of the vehicle-height sensors 34F and 34R, it is possible to sense whether or not the vehicle body is level or horizontal. In this manner, it is possible to indirectly sense an inclination of the vehicle body due to the steering operation of an operator.

Figure 7:
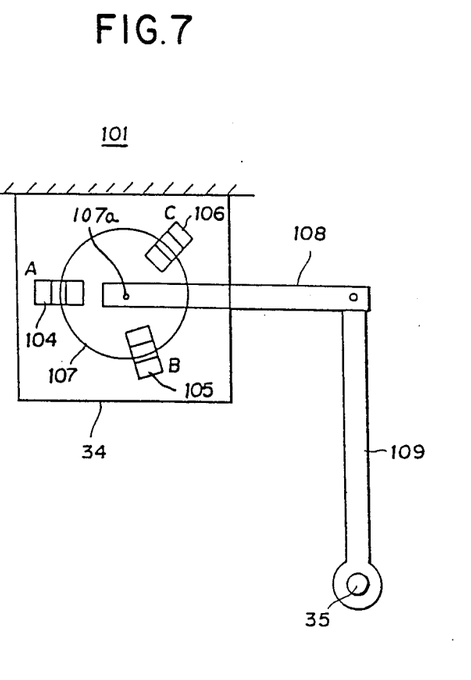
FIG. 7 is a schematic illustration of a vehicle-height sensor as employed in the suspension control apparatus of FIG. 1.
Figure 8:
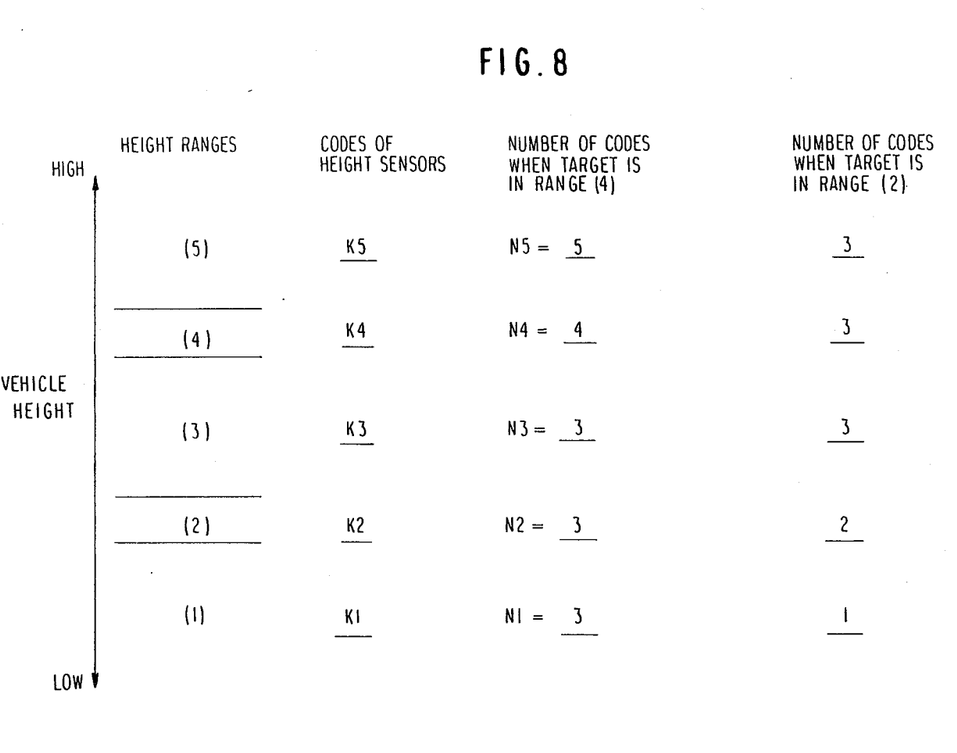
FIG. 8 is an explanatory view showing control codes output from the vehicle-height sensor which correspond to vehicle-height changes.

An example of such vehicle-height sensors 34F, 34R is illustrated in FIG. 7. In the illustrated example, a vehicle-height sensor, generally designated by reference numeral 34, comprises a housing 102 fixedly attached to a vehicle body 101, a vertical rod 109 rotatably mounted at its lower end on the lateral rod 35, and a horizontal arm 108 rotatably connected at its one end with the upper end of the vertical rod 109 and fixedly connected at its other end with a rotation shaft 107a of a slitted circular disk 107 for integral rotation therewith. The vehicle-height sensor 34 further includes a plurality (three in the illustrated example) of photo interrupters 104 through 106 which are disposed around the circumferential portion of the slitted circular disk 107 at equal circumferential intervals, i.e., circumferentially spaced apart from each other at an angle of 120 degrees for producing an electrical signal having an on-off pattern based on an on-off pattern of light formed by the slitted disk 107. With this vehicle-height sensor 34 as constructed above, when there is a change in the vehicle height or vertical distance between the vehicle body 101 and the lateral rod 109, the vertical rod 109 is caused to move vertically and the horizontal arm 108 is thereby rotated around the rotation shaft 107a integrally therewith so that the slitted disk 107 are rotated in the clockwise or counterclockwise direction from a reference position which it takes at a predetermined normal vehicle height. In this connection, the angle of rotation of the slitted disk 107 from the reference position is proportional to a vertical deviation or change in the vehicle height from the normal vehicle-height level. When the slitted disk 107 is thus rotated, the photo interrupters 104 through 106 act to output a detection signal in the form of a code corresponding to the change in the vehicle height thus detected, as illustrated in FIG. 8. In this example, the maximum number of areas to be detected is $2^3$, i.e., 8.

A speed sensor 38 is incorporated in a speedometer for sensing the traveling speed of the vehicle. The speed sensor 38 sends an output signal representative of the vehicle speed thus sensed to the control unit 37. The speed sensor 38 serves, in combination with the vehicle-height sensors 34F, 34R, as a pitching and bouncing sensing means for sensing vertical movements of the vehicle body including pitching and bouncing thereof.

Figure 2:
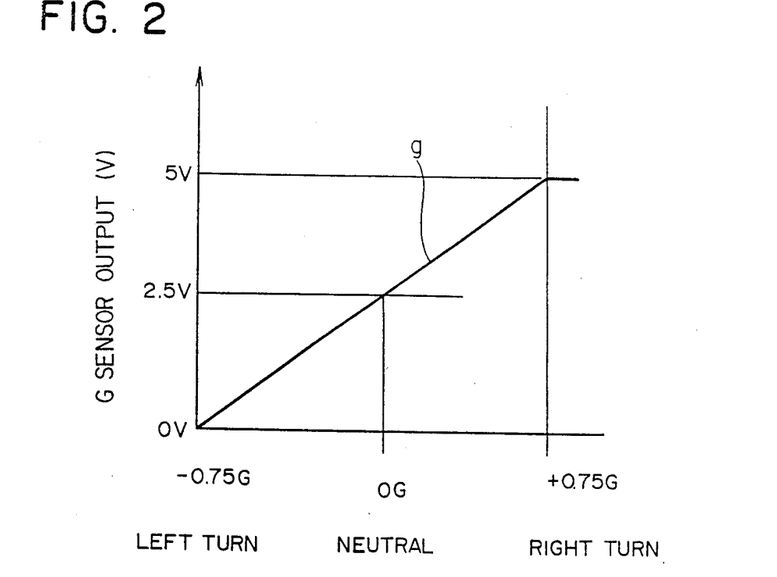
FIG. 2 is a graphic representation showing the output voltage characteristics of a G sensor employed in the suspension control apparatus of FIG. 1.

For the purpose of sensing a change in the attitude of the vehicle, there is provided a vehicle-attitude sensor 39 which constitutes a roll sensing means for sensing a rolling state of the vehicle body. The vehicle-attitude sensor 39 is, in the illustrated embodiment, an acceleration sensor in the form of a different transformer type G sensor (hereinafter simply referred to as a G sensor) for example. The G sensor 39 has characteristics in which the output voltage of the sensor 39 is 2.5 V at a neutral point of 0 G when the vehicle runs straight, increases therefrom when the vehicle is steered to make a righthand turn and decreases therefrom when the vehicle is steered to make a lefthand turn. The output voltage of the G sensor 39 differentiated by time is in proportion to the angular velocity of a steering wheel 41.

Also provided are a steering sensor 40 for sensing the rotational speed or steering speed of the steering wheel 41 and an accelerator pedal sensor 42 for sensing the amount or angle of depression imparted to an unillustrated accelerator pedal by the operator. The output signals of the steering sensor 40 and the accelerator pedal sensor 42 representative of the sensed steering speed and the sensed accelerator pedal depression amount or angle are fed to the control unit 37. The acceleration pedal sensor 42 and the speed sensor 38 constitute, together with an unillustrated brake switch, a nose-dive and squat sensing means for sensing a nose-dive state and a squat state of the vehicle body.

Figure 3A:
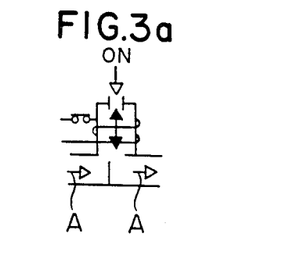
FIGS. 3a and 3b are schematic illustrations showing the operative (turn-on) condition and the inoperative (turn-off) condition, respectively, of a three-way solenoid valve employed in the suspension control apparatus of FIG. 1.
Figure 3B:
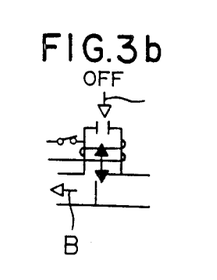
Figure 4A:
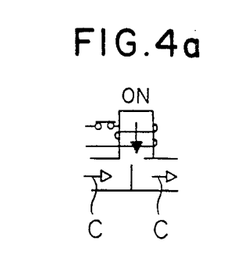
FIGS. 4a and 4b are schematic illustrations showing the operative (turn-on) condition and the inoperative (turn-off) condition, respectively, of an on/off solenoid valve employed in the suspension control apparatus of FIG. 1.
Figure 4B:
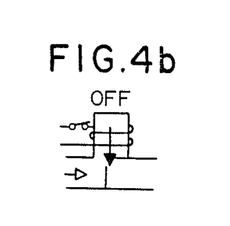

A compressor relay 43 for driving the compressor 11 is provided which is controlled by a control signal from the control unit 37. A pressure switch 44 is provided which is turned on when the pressure in the high-pressure reservoir tank 15a decreases below a predetermined value. The pressure switch 44, when turned on, sends an output signal to the control unit 37 so that the compressor relay 43 is actuated by a control signal from the control unit 37 to drive the compressor 11. By the operation of the compressor 11, compressed air is delivered to the high-pressure reservoir tank 15a until the pressure in the tank 15a rises above a predetermined level. In this regard, it should be noted that the opening and closing operations of the solenoid valves 20, 22, 23, 24, 26, 27 and 30 and the valves 19, 28 and 31 are effected by control signals from the control unit 37. Each of the solenoid valves 22, 23, 26 and 27 and the valves 19, 28 and 31 comprises a three-way valve which takes two different positions as illustrated in FIGS. 3a and 3b. FIG. 3a shows a first or operative position in which the three-way valve is turned on or driven to operate so that compressed air flows in the directions as indicated by arrows A with white triangular heads. On the other hand, FIG. 3b shows a second or inoperative position in which the three-way valve is turned off or not driven so that compressed air flows through the valve in the directions as indicated by arrows B with white rectangular heads. Further, each of the solenoid valves 20, 24 and 30 comprises a two-way or on/off valve which takes two positions as illustrated in FIGS. 4a and 4b. FIG. 4a shows a first or operative position in which the two-way valve is turned on to open so that compressed air flows in the directions as indicated by arrows C with white triangular heads. On the other hand, FIG. 4b shows a second or inoperative position in which the two-way valve is turned off to close so that the flow of compressed air is stopped. Table I below illustrates which valves are opened and closed for various modes of control such as roll control, nose dive control, squat control, normal vehicle-height control and the like.

TABLE I

| | Front Air Supply Valve (20) | Rear Air Supply Valve (24) | Front Air Discharge Valve (28) | Rear Air Discharge Valve (31) | Air Supply Flow Control Valve (19) | Air Discharge Solenoid Valve (19) | Front Right Solenoid Valve (22) | Front Left Solenoid Valve (23) | Rear Right Solenoid Valve (26) | Rear Left Solenoid Valve (27) |
|---|---|---|---|---|---|---|---|---|---|---|
| Start | o | o | x | x | x | x | o | x | o | x |

TABLE I-continued

| | | | Front Air Supply Valve (20) | Rear Air Supply Valve (24) | Front Air Discharge Valve (28) | Rear Air Discharge Valve (31) | Air Supply Flow Control Valve (19) | Air Discharge Solenoid Valve (19) | Front Right Solenoid Valve (22) | Front Left Solenoid Valve (23) | Rear Right Solenoid Valve (26) | Rear Left Solenoid Valve (27) |
|---|---|---|---|---|---|---|---|---|---|---|---|---|
| (1) Roll Control | Right Turn | Maintain | x | x | o | o | x | x | o | x | o | x |
| | | Release | x | x | x | x | x | x | x | x | x | x |
| | Left Turn | Start | o | o | x | x | x | x | x | o | x | o |
| | | Maintain | x | x | o | o | x | x | x | o | x | o |
| | | Release | x | x | x | x | x | x | x | x | x | x |
| (2) Nose-Dive Control | | Start | o | x | x | x | x | x | x | x | o | o |
| | | Maintain | x | x | x | x | x | x | x | x | x | x |
| | | Restore | x | o | x | x | x | x | o | o | x | x |
| (3) Squat Control | | Start | x | o | x | x | x | x | x | x | x | x |
| | | Maintain | x | x | x | x | x | x | x | x | x | x |
| | | Restore | o | x | x | x | x | x | x | x | o | o |
| (4) Vehicle Height Control (Normal) | | Raise | o | o | x | x | o | x | x | x | x | x |
| | | Lower | x | x | o | o | x | o | o | o | o | o |
| (5) Rapid Vehicle Height Control | | Raise | o | o | x | x | x | x | x | x | x | x |
| (6) Left-Right Connection Closing | | Maintain | x | x | o | o | x | x | o | x | o | x | o: energized
x: off

Though not illustrated, the control unit 37 comprises: vehicle-height controlling means for comparing the vertical distance sensed by the vehicle-height sensing means 34 with a target vehicle height and for controlling the operations of the suspension units FS1, FS2, RS1 and RS2 in such a manner that if there is a difference between the vertical distance sensed by the vehicle-height sensing means 34 and the target vehicle height, the suspension units are operated to reduce the difference to zero; first memory means for storing a roll controlling quantity corresponding to the rolling state of the vehicle body sensed by the roll sensing means; roll controlling means for controlling the operations of the suspension units FS1, FS2, RS1 and RS2 in accordance with the roll controlling quantity stored in the first memory means so as to suppress the rolling of the vehicle body; second memory means storing a nose-dive controlling quantity and a squat controlling quantity corresponding to the nose-dive state and the squat state, respectively, of the vehicle body sensed by the nose-dive and squat sensing means; nose-dive and squat controlling means for controlling the operations of the suspension units FS1, FS2, RS1 and RS2 in accordance with the nose-dive and squat controlling quantities stored in the second memory means so as to suppress the nose diving and squatting of the vehicle body; third memory means storing a pitching controlling quantity and a bouncing controlling quantity corresponding to the pitching and the bouncing of the vehicle body sensed by the pitching and bouncing sensing means; pitching and bouncing controlling means for controlling the operations of the suspension units FS1, FS2, RS1 and RS2 in accordance with the pitching and bouncing controlling quantities stored in the third memory means so as to suppress the pitching and bouncing of the vehicle body; priority determining means for determining the order of priority for the vehicle-height and roll control, the nose-dive and squat control, and the pitching and bouncing control; and height-control stopping means for stopping vehicle-height control during the time when a control having higher priority than the vehicle-height control as determined by the priority determining means is being carried out. The control unit 37 further comprises time-saving means for reducing a height-control determining time interval between the finishing of the height-control stopping operation of the height-control stopping means and the starting of the vehicle-height controlling operation in comparison with that required during a normal operating state of the vehicle in which no active suspension control is performed.

Now, normal vehicle-height control using the above-described height sensors 34F, 34R as illustrated in FIG. 7 in accordance with the present invention will be described.

The vehicle-height sensors 34F, 34R each output an electrical signal in the form of a control code to the control unit 37 through an unillustrated input circuit. As illustrated in FIG. 8, the control code includes, for example, $K_1$ through $K_5$ which correspond to a low height range, a low-intermediate height range, an intermediate height range, an intermediate-high height range, and a high height range, respectively. The control unit 37 reads out the control codes output from the vehicle-height sensors 34F, 34R in a first sampling time longer than a transition speed of the codes of the vehicle-height sensors which is defined by a resonance frequency of 12 Hz of the unsprung portion of the vehicle body. It is desirable that the sampling time be 3 ms to 9 ms.

Simultaneous with this, the control unit 37 receives other information such as the output of the vehicle-speed sensor 38 through the input circuit, and determines a target vehicle height based on the information thus input. Then, the control unit 37 converts the control code from each of the vehicle-height sensors 34F, 34R into one of numerical values $N_1$ through $N_5$ as illustrated in FIG. 8 in accordance with the target vehicle height thus determined. The thus converted value of the control code is input to an unillustrated central processing unit (hereinafter abbreviated as CPU) in the control unit 37 every first sampling time, and added therein.

The total sum of the converted values of the control codes output from the vehicle-height sensors 34F, 34R thus added is averaged every second sampling time which is longer than the period of a resonance frequency of the sprung portion of the vehicle body, and a prescribed number of the average values of the respective total sums are consecutively stored at a time in the memory in the control unit 37 in a first-in and first-out manner. Thus, in this case, when the latest average value is stored in the memory, the oldest one is cleared.

It is desirable that this second sampling time be 1 to 2 seconds since it is enough to average a vibration at a resonance frequency of about 1.4 Hz of the sprung portion of the vehicle body.

Now, an average value of the vehicle height is considered in cases where the vehicle height is caused to vibrate with a large or a small amplitude while the target vehicle height is in range (4) in FIG. 8. In this case, if the detected vehicle height is greater than the target value, the average value of the vehicle height takes 5; if the detected vehicle height is equal to the target value, it takes 4; and if the detected vehicle height is less than the target value, it takes 3. Accordingly, the average value of the vehicle height is between 3 to 5.

Further, as the average vehicle height goes up, the average value of the total sums approaches 5 whereas the average value of the total sums approaches 3 as the average vehicle height goes down. Comparing the average value of the total sums up to the last N-th time, which are determined in the above manner and rounded to the nearest whole number, with the target value of 4, it is determined whether vehicle-height control should be started or stopped. If the average values during past N times are all greater than 4, control of lowering the vehicle height is carried out whereas if the average values during the past N times are all less than 4, control of raising the vehicle height is carried out.

When the latest value of average vehicle height becomes equal to or greater than 4 during height-raising control, the height control is stopped. On the other hand, when the latest value of average vehicle height becomes equal to or less than 4 during the height-lowering control, the height control is also stopped. In this manner, the actual vehicle height can be controlled to be in a target range near 4.

The number of determinations N about average vehicle-height values during the last N times can be changed depending upon the traveling condition of the vehicle. For example, the number of determinations N may be set at 4 when the vehicle stands still so that the averaging of detected vehicle-height values is effected once for every about 6 seconds ($4 \times 1.5 = 6$), enabling quick start of height control whereas the number of determinations N may be 20 during travel of the vehicle so that averaging is effected once for every about 30 seconds ($20 \times 1.5 = 30$), reducing the number of height-control operations as far as possible.

The normal vehicle-height raising or lowering control can be carried out by controlling the solenoid valves 20 through 27 in the manner as shown in (4) in Table I above, and it is stopped by turning off all the valves 20 through 27.

Figure 5:
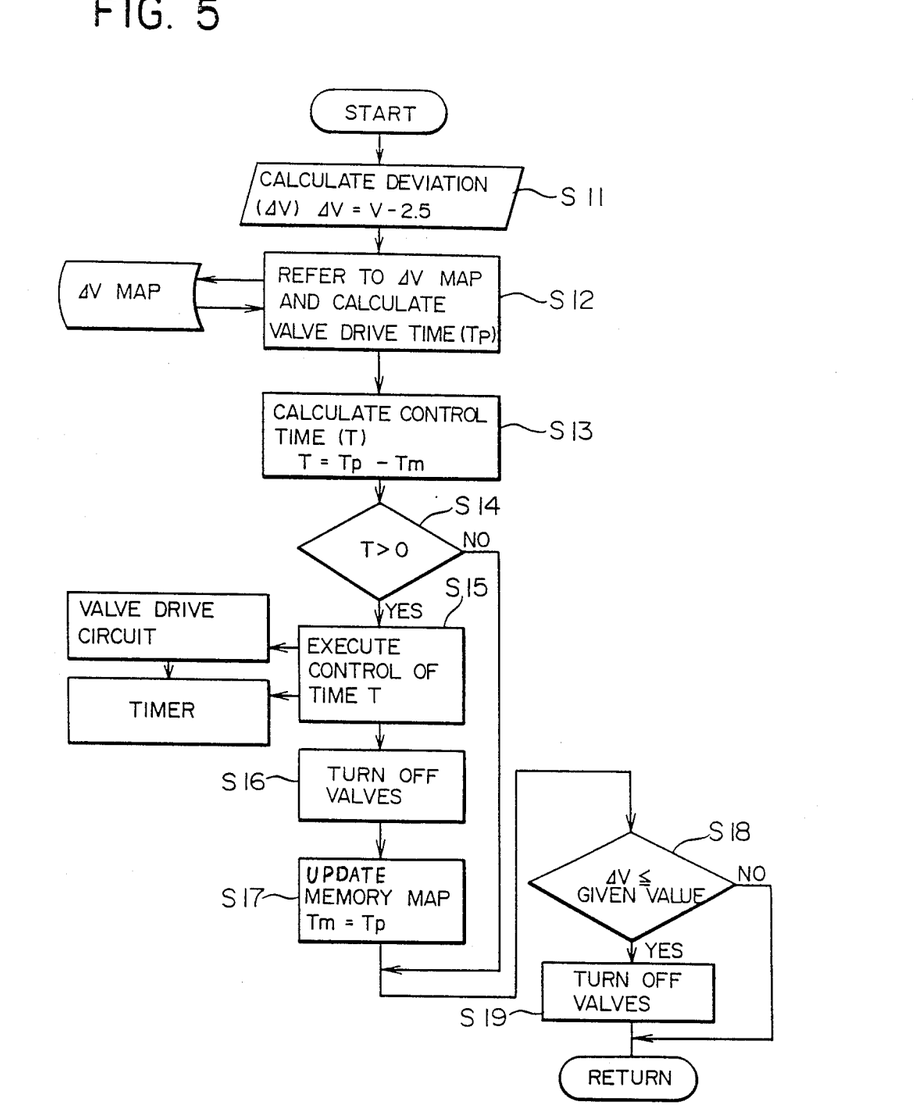
FIG. 5 is a flow chart showing the roll-suppressing operation of the suspension control apparatus of FIG. 1.

Next, roll-suppression control in accordance with the present invention will be described while referring to the flow chart of FIG. 5.

First in Step S11, the control unit 37 reads out the output voltage $V_1$ of the G sensor 39 and calculates a deviation $\Delta V$ of the output voltage $V_1$ from the neutral point $V_o$ which is 2.5 V; i.e., $\Delta V = V - 2.5$. In this regard, it is to be noted that $\Delta V > 0$ represents a leftward acceleration and $\Delta V < 0$ a rightward acceleration.

Figure 6:
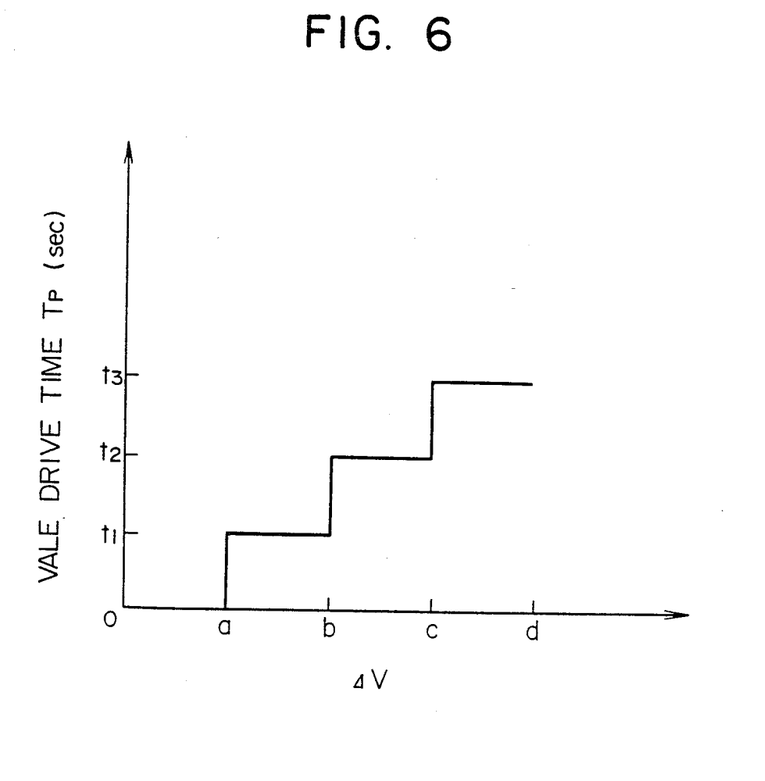
FIG. 6 is a graphic representation showing the relationship between a valve drive time $T_p$ and a deviation V from a neutral point of the G sensor.

Then in Step S12, the $\Delta V$ map, as illustrated in FIG. 6, which is stored in the control unit 37, is referred to so as to calculate an appropriate valve drive time $T_p$ which corresponds to the calculated deviation $\Delta V$ of the G sensor output voltage $V_1$. In Step S13, a control time or duration T is calculated by the following formula;

$$T = T_p - T_m$$

where $T_m$ represents a period of time for which the related valves were already driven to operate or open and which is stored in the memory map. Accordingly, if the control process proceeds to Step S13 for the first time, $T_m$ is zero and T is equal to $T_p$.

Subsequently in Step S14, it is determined whether T is greater than zero (T>0). If it is determined that T is greater than zero (T>0), then in Step S15 valve control is effected for a time duration of T. In this case, which valves are driven to open is indicated in Table I.

For example, in the case of a rightward turn (i.e., V>0), there is a tendency that the vehicle body is raised at the right side and lowered at the left side. In order to suppress this tendency, valves marked with 0 is driven to open for the control time T so that compressed air in the high-pressure reservoir tank 15a is supplied to the primary pneumatic spring chambers 7 of the front and rear left-side suspension units FS1 and RS1 via the flow control valve 19, the front and rear supply valves 20 and 24, the solenoid valves 23 and 27, thereby biasing the vehicle body in a direction to rise at the left side thereof.

On the other hand, compressed air in the primary pneumatic spring chambers 7 of the front and rear right-side suspension units FS2 and RS2 is discharged to the low-pressure reservoir tank 15b via the front and rear discharge valves 28 and 31, thus biasing the vehicle body in a direction to lower at the right side thereof. In this manner, the tendency of the vehicle body to be transversely inclined by centrifugal force during a rightward turn of the vehicle is effectively suppressed.

After the control time T is up, the control process proceeds to Step S16 in which the front supply valve 20 and the rear supply valve 24 are turned off to close so that the supply of compressed air to the primary pneumatic spring chambers 7 of the front and rear left-side suspension units FS1 and RS1 is stopped. At the same time, the front and rear discharge valves 28 and 31 are turned on to stop the discharge of compressed air from the primary pneumatic spring chambers 7 of the front and rear right-side suspension units FS2 and RS2. As a result, the attitude of the vehicle body as adjusted above is maintained.

Subsequently in Step S17, the map memory stored in the control unit 37 is updated. That is, the period of time $T_p$ for which the related valves were driven to open is freshly stored as $T_m$ in the control unit 37 ($T_m = T_p$).

Thereafter in Step S18, it is determined whether $\Delta V$ is not greater than a given value. If $\Delta V$ is greater than the given value during a turning movement of the vehicle for example, the next step S19 of stopping the attitude control is skipped and the control process returns from Step S18 to the first Step S11.

On the other hand, in Step S18, if it is determined that ΔV is not greater than the given value, the control process proceeds to Step S19 wherein the related valves are all turned off to remove or stop the attitude control performed in Step S16. Thereafter, the control process returns from Step S19 to the first Step 11, and a new valve drive time $T_p$ is calculated by the use of the now updated ΔV map in Step S12.

Further, it is determined whether or not nose dive control or squat control should be effected, based on the output signals from the accelerator pedal sensor 42, an unillustrated brake switch and the vehicle-height sensor 38 as well as based on an acceleration and a deceleration which are calculated by differentiating the output of the vehicle-height sensor 38. Also, it is determined whether or not there is rapid starting, rapid acceleration, rapid deceleration or rapid braking of the vehicle, and an appropriate quantity for nose dive control or squat control is determined depending upon the above determination so that a nose dive control or squat control is carried out for a necessary period of time, as illustrated by (2) or (3) in Table I. Further, the control unit 37 determines the state of pitching or bouncing of the vehicle body based on the outputs from the vehicle-height sensors 34F, 34R and the vehicle-speed sensor 38, so that it calculates appropriate quantities (i.e., time duration for opening and closing the valves) for pitching or bouncing control based on the determined state of pitching or bouncing, thereby carrying out pitching or bouncing control as illustrated by (5) or (6) in Table I.

Figure 9:
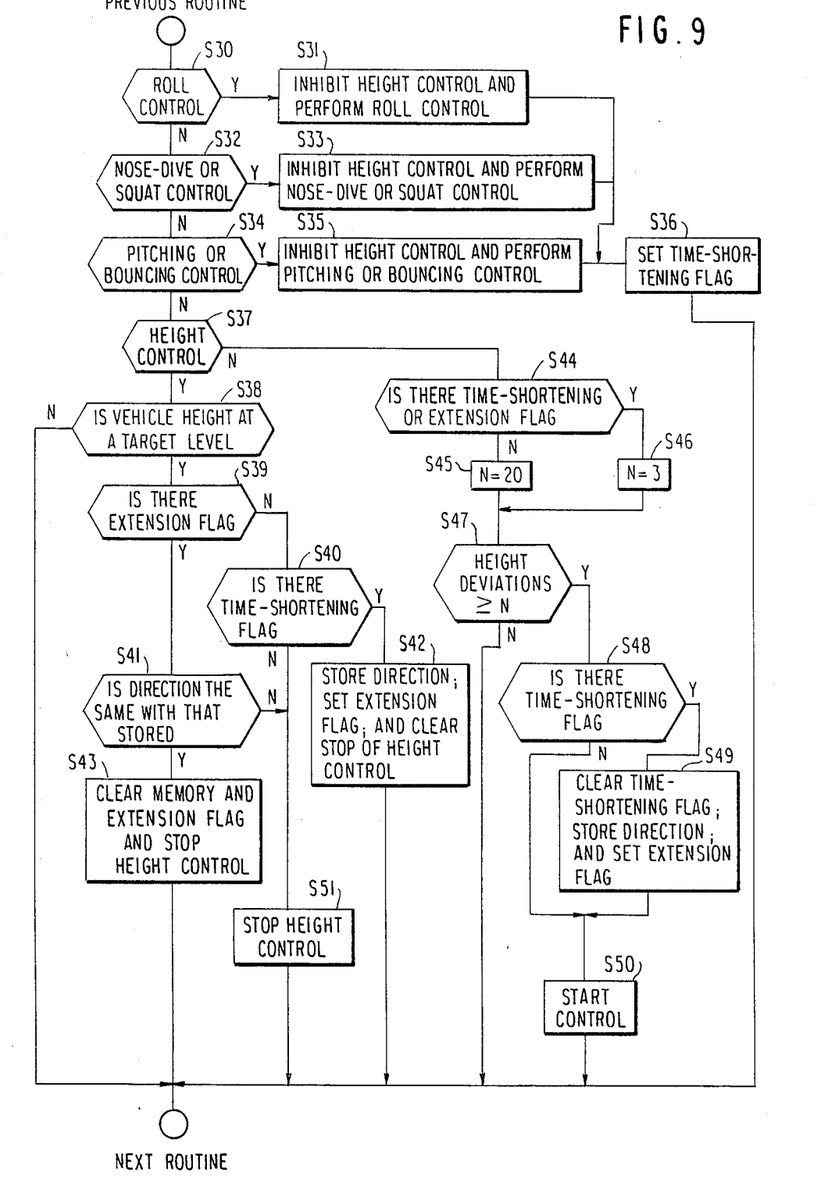
FIG. 9 is a flow chart showing the process of control operations performed by the present suspension control apparatus of FIG. 1 in cases where a plurality of suspension controls such as roll control, nose dive control, squat control, pitching control and bouncing control are carried out simultaneously.

Now, the case in which roll control, nose dive or squat control, pitching or bouncing control, and normal vehicle-height control are effected simultaneously is considered hereinbelow with reference to the flow chart of FIG. 9.

First, in Step S30, it is determined whether the requirements for roll control are satisfied or whether roll control is being carried out. If it is determined "YES" (i.e., the requirements for roll control are satisfied or roll control is being carried out), the control process proceeds to Step S31 where vehicle-height control is inhibited and roll control is started or continued. Then, the control process proceeds to Step S36 where a time-shortening flag is set. The time-shortening flag serves to determine in a short period of time (i.e., N (=3) ×1.5=4.5 seconds) whether or not vehicle-height control is to be started after inhibition of vehicle-height control has been released.

On the other hand, if the determination in Step S30 is "NO", the control process proceeds to Step S32 where it is determined whether the requirements for nose dive or squat control, which has the second high priority, are satisfied, or whether nose dive or squat control is being carried out. If it is determined "YES", the control process proceeds to Step S33 whereas if "NO", the control process proceeds to Step S34.

In Step S33, vehicle-height control is inhibited and nose dive or squat control is performed. Thereafter, the control process proceeds to Step S36 where a time-shortening flag is set, and then it proceeds to the next routine.

In Step S34, it is determined whether or not the requirements for pitching or bouncing control having the third high priority are satisfied or whether pitching or bouncing control is being carried out, and if these requirements are satisfied or if pitching or bouncing control is being carried out, the control process proceeds to Step S35 where vehicle-height control is inhibited and pitching or bouncing control is started or continued. After Step S35, the control process proceeds to Step S36.

If the determination in Step S34 is "NO", i.e., only if any of the requirements in Steps S30, S32 and S34 are not satisfied, the control process proceeds from Step S34 to Step S37 where it is determined whether vehicle-height control is being carried out. If the determination in Step S37 is "YES", the control process proceeds to Step S38 for determining whether or not the vehicle-height control should be stopped, and if it is "NO" in Step S37, the control process proceeds to Step S44 for determining whether or not vehicle-height control should be started.

In the case when in Step S36 it is determined that the time-shortening flag is set, i.e., no vehicle-height control has been effected after the finish of active suspension control operations, the determination in Step S44 is "YES". In this case, the number N is then made to be 3 in Step S46 and the control process proceeds from Step S46 to Step S47. Similarly, if it is determined that a later-described extension flag is"1" in step S46, the process also proceeds to Step S47.

If the determination in Step S44 is "NO", the number N is normally made to be 20 in Step S45, and the control process proceeds to Step S47. In Step S47, if it is determined that the number of past vehicle-height deviations which have occurred in the same direction is equal to or above a prescribed number N, the control process proceeds to Step S48 but it is "NO" in Step S47, nothing happens and the process proceeds to the next routine.

In Step S48, it is determined whether there is a time-shortening flag, and if there is a time-shortening flag, i.e., the time-shortening flag is "1", the process proceeds to Steps S49 where the time-shortening flag is cleared to "0"; the direction of the vehicle-height deviation from the prescribed normal level is stored in a memory in the control unit 37; and the extension flag is set to be "1". Thereafter, the control process proceeds to Step S50 for starting vehicle-height control.

On the other hand, if it is determined "YES" in Step S38, i.e., if the vehicle height reaches the target level, the control process proceeds to Step S39 where it is determined whether there is an extension flag, but if the determination in Step S38 is "NO", the process proceeds to the next routine without carrying out vehicle-height control. In Step S39, if there is an extension flag, i.e., if the extension flag is "1", then in Step S40 the determination of the time-shortening flag is effected. If it is determined in Step S40 that there is a time-shortening flag, then in Step S42 it is determined that vehicle-height control has been effected for the first time after the finish of the active suspension control operation(s) so that the direction of the vehicle-height control as carried out is stored in the memory in the control unit 37; the extension flag is set to be "1"; and the time-shortening flag is cleared, thus inhibiting vehicle-height control.

In this state, vehicle-height control is restarted and at the time when the vehicle-height control is finished, the determination in Step S39 is made to be "YES" so that the control process proceeds to Step S41 where it is determined whether the direction of the vehicle-height control as carried out is the same as that stored in the memory. If the determination in Step S41 is "YES", the process proceeds to Step S43 where the extension flag and the memory are cleared, the vehicle-height control is stopped and the control process proceeds to the next routine. Thereafter, in subsequent determinations of vehicle-height control, the number N is returned to the normal value 20.

On the other hand, if the determinations in Steps S40 and S41 are "NO", the vehicle-height control is stopped in Step S51 and the control process proceeds to the next routine.

As described in the foregoing, according to the present invention, priority is set for determining the order of various active suspension control operations so that normal vehicle-height control is inhibited during the time when active suspension control operations such as roll control, nose-dive and squat control, pitching and bouncing control and the like are being carried out, and a deviation of the vehicle height from a normal height level is quickly corrected immediately after the finish of the active suspension control operations, thereby preventing occurrence of any drawbacks resulting from time lags in suspension control operations as well as substantially shortening the time required for starting vehicle-height control.

What is claimed is:

1. A suspension control apparatus for a vehicle comprising:
    a plurality of suspension units each disposed between a road wheel and the body of a vehicle for suspending the corresponding road wheel from the vehicle body;
    a vehicle-height sensing means sensing a vertical distance between an axle of each of said road wheels and a specific portion of the vehicle body;
    roll sensing means sensing a rolling state of the vehicle body;
    nose-dive and squat sensing means sensing a nose-dive state and a squat state of the vehicle;
    pitching and bouncing sensing means sensing vertical movements of the vehicle body including pitching and bouncing thereof; and
    a control unit electrically connected to receive outputs of said vehicle-height sensing means, said roll sensing means, said nose-dive and squat sensing means, and said pitching and bouncing sensing means for controlling said suspension units in such a manner that if there is a difference between the vertical distance sensed by said vehicle-height sensing means and the target vehicle height, the difference is reduced to zero, and that forces acting between the road wheels and the vehicle body are adjusted to suppress the nose diving, squatting, pitching and bouncing of the vehicle body, said control unit being further operable to determine the order of priority for the vehicle-height and roll control, the nose-dive and squat control, and the pitching and bouncing control so that the vehicle-height control is stopped during the time when a control having higher priority than the vehicle-height control is being carried out.

2. A suspension control apparatus for a vehicle as claimed in claim 1, wherein said control unit is further operable to reduce a height-control determining time interval between the finishing of the height-control stopping operation and the starting of the vehicle-height controlling operation in comparison with that required during a normal operating state of the vehicle in which no active suspension control is performed.

3. A suspension control apparatus for a vehicle as claimed in claim 1, wherein said control unit comprises:
    vehicle-height controlling means for comparing the vertical distance sensed by said vehicle-height sensing means with a target vehicle height and for controlling the operations of said suspension units in such a manner that if there is a difference between the vertical distance sensed by said vehicle-height sensing means and the target vehicle height, said suspension units are operated to reduce the difference to zero;
    first memory means for storing a roll controlling quantity corresponding to the rolling state of the vehicle body sensed by said roll sensing means;
    roll controlling means for controlling the operations of said suspension units in accordance with the roll controlling quantity stored in said first memory means so as to suppress the rolling of the vehicle body;
    second memory means storing a nose-dive controlling quantity and a squat controlling quantity corresponding to the nose-dive state and the squat state, respectively, of the vehicle body sensed by said nose-dive and squat sensing means;
    nose-dive and squat controlling means for controlling the operations of said suspension units in accordance with the nose-dive and squat controlling quantities stored in said second memory means so as to suppress the nose diving and squatting of the vehicle body;
    third memory means storing a pitching controlling quantity and a bouncing controlling quantity corresponding to the pitching and the bouncing of the vehicle body sensed by said pitching and bouncing sensing means;
    pitching and bouncing controlling means for controlling the operations of said suspension units in accordance with the pitching and bouncing controlling quantities stored in said third memory means so as to suppress the pitching and bouncing of the vehicle body;
    priority determining means for determining the order of priority for the vehicle-height and roll control, the nose-dive and squat control, and the pitching and bouncing control; and
    height-control stopping means for stopping vehicle-height control during the time when a control having higher priority than the vehicle-height control as determined by said priority determining means is being carried out.

4. A suspension control apparatus for a vehicle as claimed in claimed in claim 3, wherein said control unit further comprises time-saving means for reducing a height-control determining time interval between the finishing of the height-control stopping operation of said height-control stopping means and the starting of the vehicle-height controlling operation in comparison with that required during a normal operating state of the vehicle in which no active suspension control is performed.

* * * * *